United States Patent [19]

Sykora

[11] Patent Number: 4,649,698
[45] Date of Patent: Mar. 17, 1987

[54] LAWN RAKE

[76] Inventor: Neal L. Sykora, N86 W17777 Main St., Monomonee Falls, Wis. 53051

[21] Appl. No.: 781,716

[22] Filed: Sep. 30, 1985

[51] Int. Cl.[4] ............................................. A01D 7/08
[52] U.S. Cl. .............................. 56/400.17; 56/400.21
[58] Field of Search ................ 56/400, 400.01, 400.04, 56/400.16, 400.17, 400.18, 400.19, 400.2, 400.21

[56] References Cited

U.S. PATENT DOCUMENTS

| 1,621,276 | 3/1927 | Richardson | 56/400.17 |
| 1,628,994 | 5/1927 | Orren | 56/400.21 |
| 1,735,237 | 11/1929 | Dennis | |
| 1,780,180 | 11/1930 | Falstrom | |
| 1,880,580 | 10/1932 | Tokunaga | |
| 2,014,123 | 9/1935 | Bailie | |
| 2,066,036 | 12/1936 | Greenwood | |
| 2,130,828 | 9/1938 | Sundqvist | |
| 2,468,376 | 4/1949 | Peeples | 56/400.17 |
| 2,587,424 | 2/1952 | Zeman | |
| 2,746,235 | 5/1956 | Kautenberg | 56/400.17 |
| 2,850,865 | 9/1958 | Anderson | 56/400.17 |
| 4,215,528 | 8/1980 | Fodor | 56/400.17 |

Primary Examiner—Gene Mancene
Assistant Examiner—David I. Tarnoff
Attorney, Agent, or Firm—Quarles & Brady

[57] ABSTRACT

This invention relates to lawn rakes having detachable and replaceable tines, and particularly to an improved form of rake of the type having a channel like crosshead adapted to mount a handle and with spaced flanges that have opposed slots for receiving and detachably mounting resilient tines, wherein each slot is formed with a first profile and a second profile so that the slots can accommodate either one of two tines having different cross-sections. The second profile is preferably recessed into the flanges from the limits of the first profile and the tines complement the size and shape of the respective profiles.

9 Claims, 6 Drawing Figures

LAWN RAKE

BACKGROUND OF THE INVENTION

This invention relates to lawn rakes having detachable and replaceable tines, and particularly to an improved form of such rakes which will accommodate tines of different shapes and sizes.

U.S. Pat. No. 2,468,376 issued Apr. 26, 1949 to A. M. Peeples discloses a lawn rake which uses detachable and replaceable tines formed of a stiff wire with a circular cross-section. The tines are snapped in place in complementary slots formed in a pair of spaced flanges of a crosshead that is attached to the rake handle. Other examples of rakes with detachable round wire tines are U.S. Pat. No. 1,621,276 issued Mar. 15, 1927 to F. E. Richardson and U.S. Pat. No. 1,735,237 issued Nov. 12, 1929 to E. L. Dennis.

It is also known in the prior art to form lawn rakes with detachable and replaceable tines formed of flat stock material having a rectangular cross-section. Examples of such rakes are found in U.S. Pat. No. 2,850,865 issued Sept. 9, 1958 to E. B. Anderson and U.S. Pat. No. 4,215,528 issued Aug. 5, 1980 to Fodor.

All such prior art rakes can accommodate only one size and shape of tine. However, different lawn and gardening chores require rakes with tines having different characteristics including stiffness and shape. For example, spring thatching of a lawn is best accomplished with round teeth that can dig into the layers of grass and remove the old grass. In contrast, fall leaf raking is best done with flat metal tines that are not as harsh on the lawn as round tines, and which are superior for gathering up dead leaves and debris.

A lawn rake in accordance with my invention allows the user to substitute tines of various shapes and sizes to adapt the rake to the needs of the user.

SUMMARY OF THE INVENTION

In accordance with the invention I provide an improved rake of the type having a channel like crosshead adapted to mount a handle and with spaced flanges that have opposed slots for receiving and detachably mounting resilient tines, wherein each slot is formed with a first profile and a second profile so that the slots can accommodate either one of two tines having different cross-sections. The second profile is preferably recessed into the flanges from the limits of the first profile and the tines complement the size and shape of the respective profiles.

Further in accordance with the invention, I provide a kit having component parts capable of being assembled into a rake, and in which the kit includes a channel-like crosshead as described above together with first and second sets of tines each being bent back upon itself into a loop adapted to be removably inserted into an opposed pair of slots to engage the top and bottom edges of the slots.

In the preferred embodiment the slots have a rectangular profile that is adapted to receive tines with a rectangular cross section and the second, recessed profile is semicircular so that it will accommodate tines with a circular cross section.

It is a principal object of the invention to provide a rake with replaceable tines that can be adapted to specific conditions of use.

It is another object of the invention to provide a rake that is simple in construction and yet can accommodate different sizes and types of tines by simple replacement by the user.

The foregoing and other objects and advantages of the invention will appear in the description that follows. In the description reference is made to the accompanying drawing that illustrates preferred embodiments of the invention.

DETAILED DESCRIPTION OF THE PREFERRED EMBODIMENTS

Figure 1:
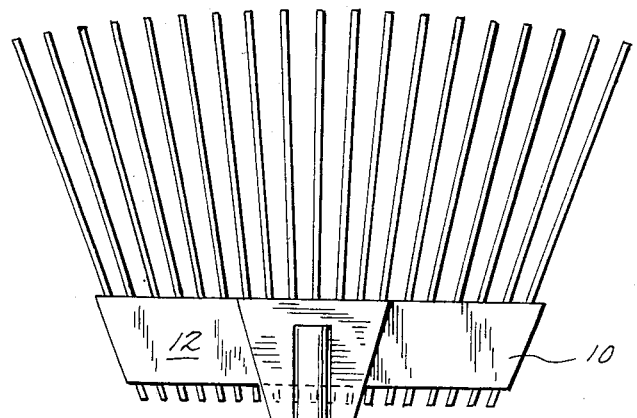
FIG. 1 is a plan view of a rake in accordance with the invention.
Figure 2:
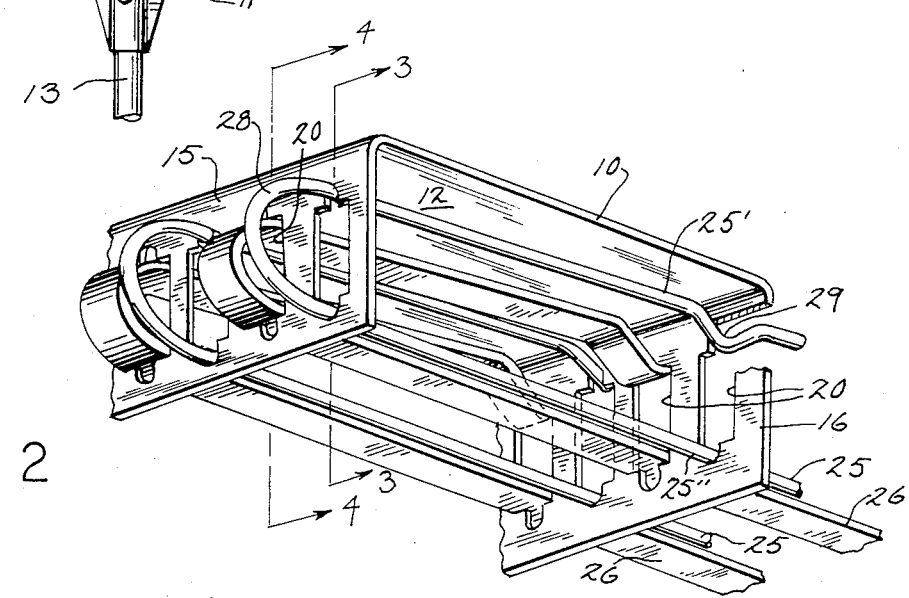
FIG. 2 is a partial view in perspective of the crosshead of the rake of FIG. 1 illustrating the slots and interengaging tines.
Figure 3:
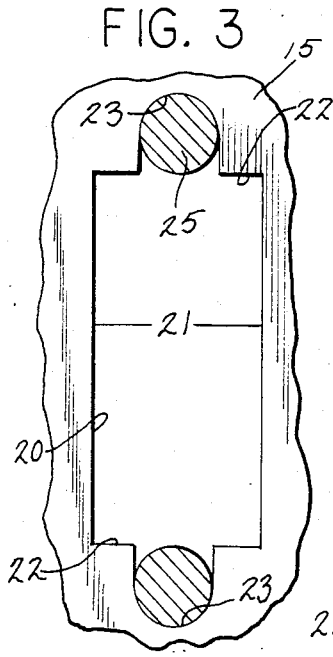
FIG. 3 is an enlarged view of a slot of the rake of FIGS. 1 and 2 and illustrating a round wire tine in place.
Figure 4:
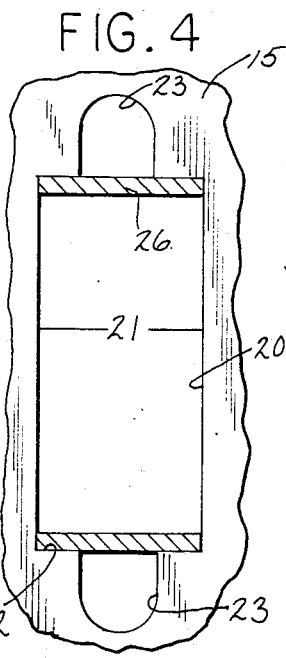
FIG. 4 is a view similar to FIG. 3 but illustrating a flat tine in place within the slot.

Referring to FIG. 1, the rake is formed of a support structure comprising a channel-like crosshead 10 that mounts a plurality of tines. A ferrule 11 attached to the web 12 of the crosshead 10 is adapted to mount a handle 13 which can be bolted in place in a known manner. As seen more particularly in FIG. 2, the crosshead 10 has a pair of spaced parallel flanges 15 and 16 at either side of the web 12. The flanges 15 and 16 each have a series of identical slots 20. As clearly shown in FIGS. 3 and 4, each of the slots 20 is shaped to have a rectangular profile defined by opposing elongated side edges 21 and opposing upper and lower edges 22. Each slot 20 also has a second profile that is recessed within the flange 15 or 16 beyond the limits of the rectangular profile. The second, recessed profile is formed in the center of both short edges 22 of the rectangular profile and the second profile has semi-circular bottom edges 23.

The slots 20 will each accommodate tines 25 formed from a stiff wire with a circular cross section. Such tines 25 are received in the second, recessed profile that includes the semi-circular edges 23. The round tines 25 are sized to complement the size of the semi-circular recess. The slots 20 can also accommodate tines 26 that are formed of flat stock material with a rectangular cross-section and such tines 26 will be received within the rectangular profile against the upper and lower edges 22. Again, the flat tines 26 are sized to complement the size of the rectangular openings.

The round tines 25 and the flat tines 26 are both formed from metal stock by bending the stock in a similar manner to allow them to be snapped in place within the slots 20 and removed and replaced as desired. The form of the round tines 25 will therefore be described in detail, but it should be understood that the flat tines 26 are similarly shaped. The round tines 25 are bent back upon themselves at their mounting end to form a loop 28 the crosshead with the result that there is a short leg 25' and a long leg 25". The two legs 25' and 25" normally divurge slightly away from each other so that they must be compressed together to be inserted in an opposing pair of slots 20. The short leg 25' has a detent 29 bent into its end that can lock into the slot 20.

Figure 5:
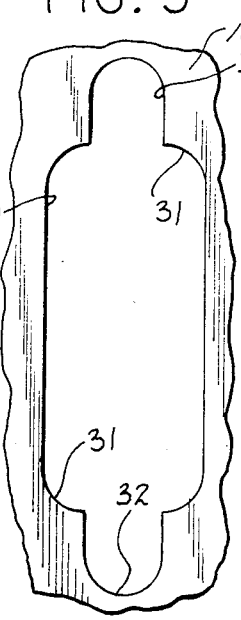
FIGS. 5 and 6 are views similar to FIG. 3 but illustrating alternate forms for the slots of the rake.
Figure 6:
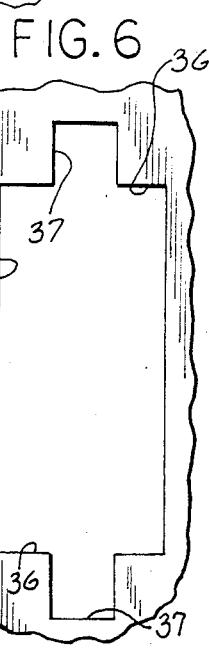

As shown in FIGS. 5 and 6, the slots in the crosshead 10 can include a variety of profiles. Slots 30 may include a first profile having curved top and bottom edges 31 to receive tines with an oval cross-section, and a second profile including semi-circular recessed edges 32 to receive tines with a circular cross-section. Slots 35 may also include a first rectangular profile with straight top and bottom edges 36 for receiving a flat rectangular tine, and a second profile including square recesses 37 for receiving square tines.

The rake of the present invention is preferably supplied to a user in the form of a kit that includes at least one crosshead 10 and two complete sets of tines of different cross-section. The kit may also include a handle 14, or the user may provide his own handle. The user can then assemble the rake with the set of tines best suited to the particular task at hand. The user can later change the set of tines if the other set is best for a different task. The user can also install tines from both sets if desired. The short leg 25' has a detent 29 bent into its end that can lock into the slot 20.

I claim:

1. In a rake including a channel-like crosshead adapted to mount a handle and having spaced flanges that have opposed slots which receive and detachably mount resilient tines, the improvement wherein:
    each slot is formed with a first profile that is adapted to receive tines having a first complementary cross-section and with a second profile that is adapted to receive tines having a second complementary cross-section.

2. In a rake including a channel-like crosshead adapted to mount a handle and having spaced flanges that have opposed slots which receive and detachably mount resilient tines, the improvement wherein:
    each slot is formed with a first profile that receives tines of a first cross-section, and each slot is formed with a second profile that is recessed into the respective flange beyond the limits of the first profile and receives tines of a second cross-section.

3. A rake in accordance with claim 2 wherein the first profile is rectangular and the first cross section is rectangular.

4. A rake in accordance with claim 3 wherein the second profile is semi-circular and the second cross section is circular.

5. In a rake including a channel-like crosshead adapted to mount a handle and which has spaced flanges that have opposed slots that receive and detachably mount resilient tines, and in which the tines are bent back upon themselves into a loop which traverses an opposed pair of slots and engages upper and lower edges of each slot, the improvement wherein:
    the slots are each formed with a rectangular profile to receive tines with a flat, rectangular cross-section and a semi-circular profile to receive tines of a circular cross-section.

6. A rake in accordance with claim 5 wherein the semicircular profile is formed in the upper and lower edges of the rectangular profile.

7. A rake kit having component parts capable of being assembled into a rake, the kit comprising the combination of:
    a channel-like crosshead adapted to mount a handle and having spaced flanges that have opposed slots, each slot being formed with a first profile and a second profile that is recessed into the flange from the limits of the first profile; and
    first and second sets of tines, each tine being bent back upon itself into a loop that is adapted to be removably inserted into an opposed pair of slots to engage the top and bottom edges of the slots, the tines of the first set each having a cross-section that complements the first profile and the tines of the second set each having a cross-section that complements the second profile.

8. A rake kit in accordance with claim 7 wherein the first profile is rectangular and the tines of the first set have a flat rectangular cross-section and the second profile extends from the centers of the top and bottom edges of the first profile.

9. A rake kit in accordance with claim 8 wherein the second profile is semicircular and the tines of the second set have a circular cross-section.

* * * * *